US012265342B2

(12) United States Patent
Wada et al.

(10) Patent No.: US 12,265,342 B2
(45) Date of Patent: Apr. 1, 2025

(54) IMAGE FORMING APPARATUS

(71) Applicant: KYOCERA Document Solutions Inc., Osaka (JP)

(72) Inventors: Minoru Wada, Osaka (JP); Takahiro Okubo, Osaka (JP); Takeru Nagamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 64 days.

(21) Appl. No.: 18/489,272

(22) Filed: Oct. 18, 2023

(65) Prior Publication Data

US 2024/0142891 A1 May 2, 2024

(30) Foreign Application Priority Data

Oct. 26, 2022 (JP) ................................ 2022-171120

(51) Int. Cl.
*G03G 15/08* (2006.01)
*G03G 9/08* (2006.01)

(52) U.S. Cl.
CPC ....... *G03G 15/0812* (2013.01); *G03G 9/0821* (2013.01); *G03G 15/0818* (2013.01); *G03G 2215/0617* (2013.01)

(58) Field of Classification Search
CPC ............... G03G 15/08; G03G 15/0806; G03G 15/0808; G03G 15/0812; G03G 15/0818; G03G 2215/0614
See application file for complete search history.

(56) References Cited

U.S. PATENT DOCUMENTS

2005/0287457 A1* 12/2005 Miyakawa ......... G03G 9/09708 430/108.6
2013/0136508 A1* 5/2013 Nakagawa ............. G03G 13/08 399/285
2015/0132032 A1* 5/2015 Hagiwara .......... G03G 15/0818 399/286

FOREIGN PATENT DOCUMENTS

JP 2022-032389 A 2/2022

* cited by examiner

*Primary Examiner* — Thomas S Giampaolo, II
(74) *Attorney, Agent, or Firm* — Stein IP LLC

(57) ABSTRACT

An image forming apparatus includes an image carrying member, a charging device, an exposure device, a developing device, a development voltage power supply, and a control section. The developing device includes a development container which contains a non-magnetic one-component developer and a developer carrying member which includes a rotary shaft and a roller portion stacked on the outer circumferential surface of the rotary shaft, and the resistance value of the roller portion is 9 to 11 [Log Ω], and when the amount of toner conveyed on the developer carrying member is Md [g/m$^2$], the amount of toner adhered on the image carrying member in a solid image is Mp [g/m$^2$], the peripheral speed of the developer carrying member and the image carrying member are Sd [mm/sec] and Sp [mm/sec], $0.8 \times Sd/Sp < Mp/Md$ and $0.8 \leq Sd/Sp \leq 1.2$ are satisfied.

9 Claims, 7 Drawing Sheets

IMAGE FORMING APPARATUS

INCORPORATION BY REFERENCE

This application is based upon and claims the benefit of priority from the corresponding Japanese Patent Application No. 2022-171120 filed on Oct. 26, 2022, the entire contents of which are incorporated herein by reference.

BACKGROUND

The present disclosure relates to an image forming apparatus using an electrophotographic process, such as a copy machine, a printer, or a facsimile, and relates particularly to an image forming apparatus including a developing device of a non-magnetic one-component development type.

Known types of developing devices used in image forming apparatuses employing an electrophotographic method, such as a copy machine, a printer, a facsimile, and a multi-functional peripheral equipped with functions of these apparatuses, include a two-component development type using a toner and a carrier as a developer and a one-component development type using only a toner without using a carrier.

In a developing device of the non-magnetic one-component development type using a non-magnetic toner, a regulation blade as a developer regulation member is disposed so as to be in contact with a surface of a developing roller that is a developer carrying member. Further, the toner is conveyed by microscopic asperities provided on the surface of the developing roller and is regulated by the regulation blade so that any excess of the toner is removed, thus being formed into a thin toner layer. When the toner passes below the regulation blade, the toner is charged by friction with the surfaces of the regulation blade and the developing roller. Then, a photosensitive member and the developing roller are rotated in contact with each other, and thus the toner on the surface of the developing roller is developed by an electric field on the photosensitive member.

In the non-magnetic one-component development type as described above, physical stress to the toner caused by the regulation member is high, and thus the deterioration of the toner easily progresses, with the result that the life of the toner is disadvantageously short. In recent years, there has been a demand for energy saving in an image forming apparatus by fixing a toner onto a sheet under lower temperature fixing conditions than before. When in order to handle such fixing conditions, the melt viscosity of the toner is set low, the toner is more likely to receive physical stress.

SUMMARY

An image forming apparatus according to an aspect of the present disclosure includes an image carrying member, a charging device, an exposure device, a developing device, a development voltage power supply, and a control section. The image carrying member includes a photosensitive layer formed on a surface thereof. The charging device charges the image carrying member to a prescribed surface potential. The exposure device exposes the surface of the image carrying member charged by the charging device so as to form an electrostatic latent image with attenuated electrostatic charge. The developing device includes: a development container which contains a non-magnetic one-component developer composed only of a toner; a developer carrying member which is brought into pressure contact with the image carrying member at a prescribed pressing force and carries the toner on an outer circumferential surface to form a toner layer; and a regulation blade which makes contact with the outer circumferential surface of the developer carrying member so as to regulate the thickness of the toner layer formed on the outer circumferential surface of the developer carrying member, and the developing device supplies the toner to the image carrying member on which the electrostatic latent image has been formed. The development voltage power supply applies a development voltage to the developer carrying member. The control section controls driving of the developing device and the development voltage power supply. The developer carrying member includes a rotary shaft and a roller portion stacked on the outer circumferential surface of the rotary shaft, the resistance value of the roller portion is 9 to 11 [Log Ω], and when the amount of toner conveyed on the developer carrying member and regulated by the regulation blade is Md [g/m$^2$], the amount of toner adhered on the image carrying member in a solid image by movement of the toner from the developer carrying member to the image carrying member due to the development voltage is Mp [g/m$^2$], the peripheral speed of the developer carrying member is Sd [mm/sec], and the peripheral speed of the image carrying member is Sp [mm/sec], formulae (1) and (2) below are satisfied.

$$0.8\times Sd/Sp<Mp/Md \tag{1}$$

$$0.8\leq Sd/Sp\leq 1.2 \tag{2}$$

DETAILED DESCRIPTION (1. Overall Configuration of Image Forming Apparatus 1)

Figure 1:
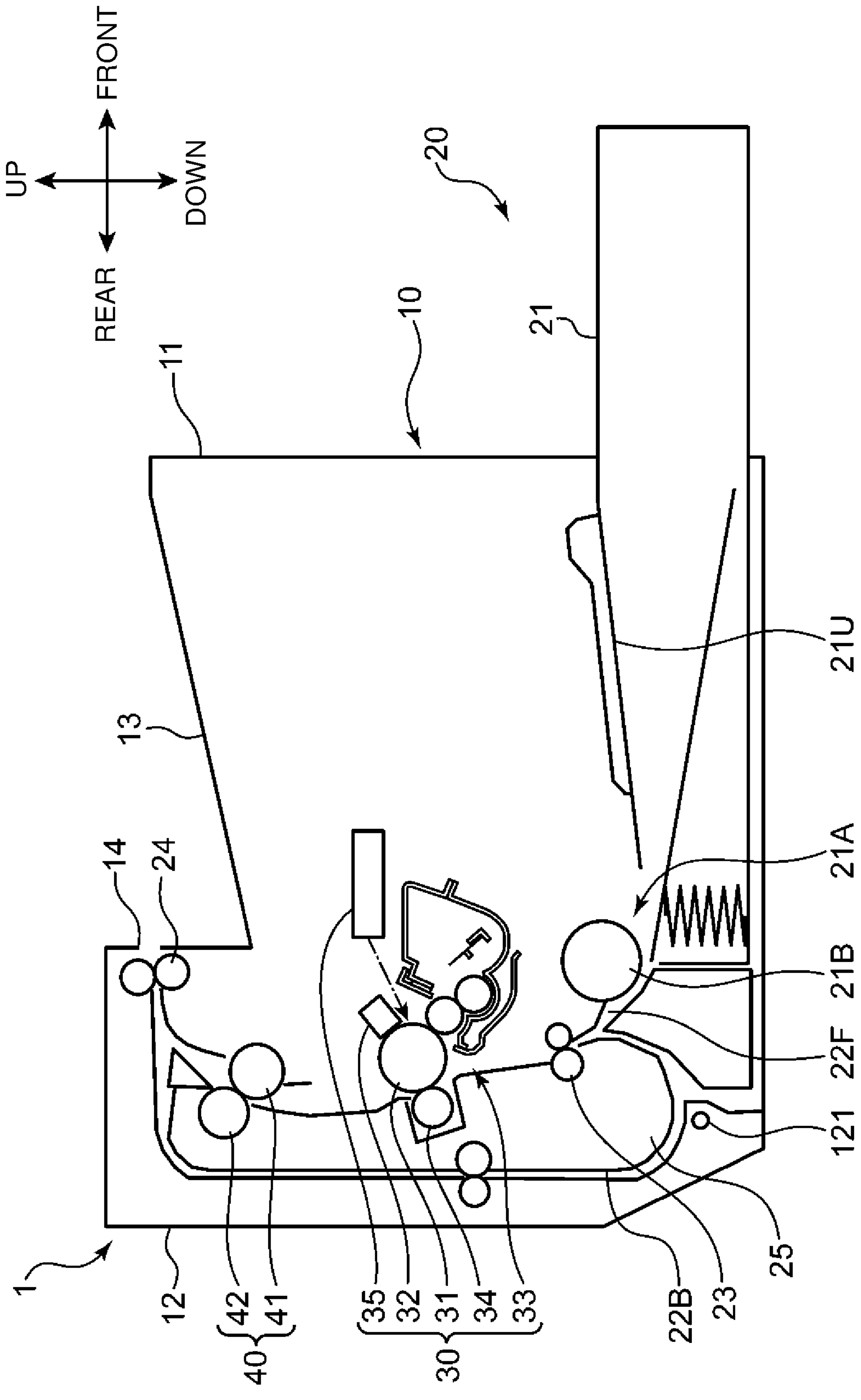
FIG. 1 is a sectional side view showing a schematic configuration of an image forming apparatus according to an embodiment of the present disclosure.

With reference to the appended drawings, the following describes an embodiment of the present disclosure. FIG. 1 is a sectional side view showing a schematic configuration of an image forming apparatus 1 according to an embodiment of the present disclosure. In FIG. 1, a right side corresponds to a front side of the image forming apparatus 1, and a left side corresponds to a rear side thereof.

The image forming apparatus 1 (herein, a monochrome printer) includes, in addition to a main body housing 10 having a housing structure substantially in a rectangular parallelepiped shape, a paper feed section 20, an image forming section 30, and a fixing portion 40, which are housed in the main body housing 10. The main body housing 10 includes a front cover 11 provided on a front surface side thereof and a rear cover 12 provided on a rear surface side thereof. When the rear cover 12 is opened, respective units of the image forming section 30 can be inserted in or taken out of the main body housing 10 from the rear surface side thereof. Furthermore, on an upper surface of the main body housing 10, there is provided a paper discharge portion 13 to which a sheet after being subjected to image formation is discharged. In the following description, a term "sheet" refers to a copy sheet, a sheet of coated paper, an OHP sheet, a sheet of cardboard, a postcard, a sheet of tracing paper, or any other sheet material to be subjected to image forming processing.

The paper feed section 20 includes a paper feed cassette 21 for housing sheets to be subjected to image forming processing. The paper feed cassette 21 has a part protruding further forward from a front surface of the main body housing 10. An upper surface of a part of the paper feed cassette 21 housed in the main body housing 10 is covered with a paper feed cassette top plate 21U. The paper feed cassette 21 is provided with a sheet housing space for housing a bundle of sheets, a lift plate with which the bundle of sheets is lifted so as to be fed, and so on. A sheet feed-out portion 21A is provided above a rear end side of the paper feed cassette 21. In the sheet feed-out portion 21A, there is disposed a paper feed roller 21B for feeding out a topmost sheet one by one from the bundle of sheets in the paper feed cassette 21.

The image forming section 30 performs an image forming operation in which a toner image (a developer image) is formed on a sheet sent out from the paper feed section 20. The image forming section 30 includes, in addition to a photosensitive drum 31, a charging portion 32, an exposure portion 35, a developing portion 33, and a transfer roller 34, which are disposed around the photosensitive drum 31.

The photosensitive drum 31 (an image carrying member) includes a rotary shaft and an outer circumferential surface (a drum main body) that rotates about the rotary shaft. The photosensitive drum 31 is formed of, for example, a known organic photoconductor (OPC), and a photosensitive layer composed of an electric charge generation layer, an electric charge transport layer, and so on is formed on the outer circumferential surface thereof. After the photosensitive layer is uniformly charged by the after-mentioned charging portion 32, light is applied thereto by the exposure portion 35 so that an electrostatic latent image with attenuated electrostatic charge is formed thereon, and by the developing portion 33, the electrostatic latent image is visualized into a toner image, which is thus carried on the photosensitive layer.

Figure 2:
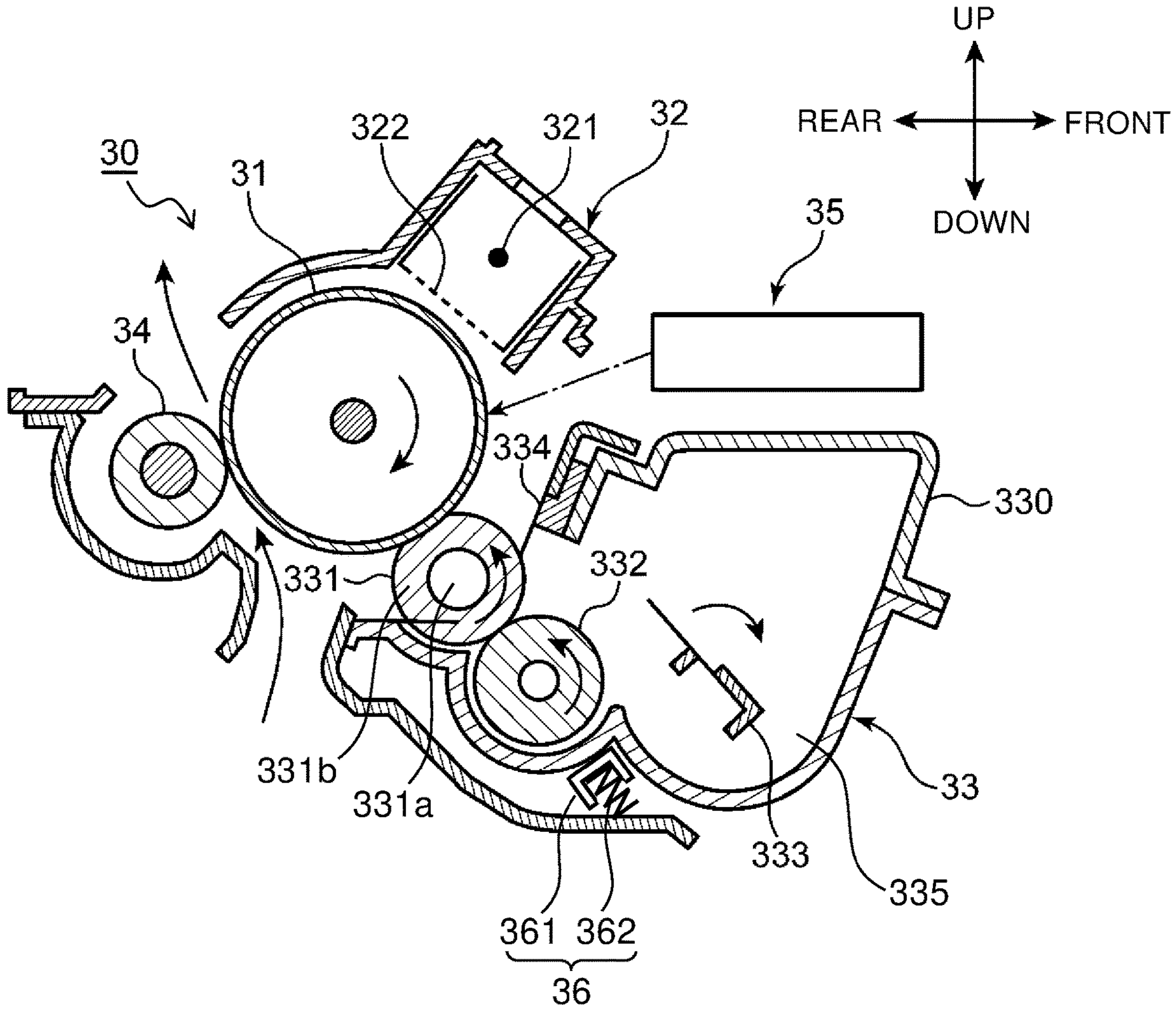
FIG. 2 is a sectional side view showing a schematic configuration of an image forming section of the image forming apparatus of the present embodiment.

The charging portion 32 (a charging device) is disposed at a prescribed distance from the outer circumferential surface of the photosensitive drum 31 and uniformly charges the outer circumferential surface of the photosensitive drum 31 without contacting it. Specifically, the charging portion 32 includes a charge wire 321 and a grid electrode 322 (both are shown in FIG. 2). The charge wire 321 is a linear electrode extending in a rotation axis direction of the photosensitive drum 31 and generates corona discharge between itself and the photosensitive drum 31. The grid electrode 322 is a grid-shaped electrode extending in the rotation axis direction of the photosensitive drum 31 and is placed between the charge wire 321 and the photosensitive drum 31. In the charging portion 32, a current having a prescribed current value is passed through the charge wire 321 so that corona discharge is generated, and a prescribed voltage is applied to the grid electrode 322, and thus the outer circumferential surface of the photosensitive drum 31 opposed to the grid electrode 322 is uniformly charged to a prescribed surface potential.

The exposure portion 35 (an exposure device) includes a laser light source and optical system instruments such as a mirror and a lens and applies, to the outer circumferential surface of the photosensitive drum 31, light modulated based on image data provided from an external apparatus such as a personal computer. With this configuration, the exposure portion 35 forms, on the outer circumferential surface of the photosensitive drum 31, an electrostatic latent image corresponding to an image based on the image data.

The developing portion 33 (a developing device) is demountably mounted in the main body housing 10 and supplies a non-magnetic one-component toner (developer) to the outer circumferential surface of the photosensitive drum 31 so as to develop an electrostatic latent image formed on the outer circumferential surface of the photosensitive drum 31. To develop an electrostatic latent image means to visualize the electrostatic latent image into a toner image (a developer image). A detailed configuration of the developing portion 33 will be described later.

The transfer roller 34 is a roller for transferring, onto a sheet, a toner image formed on the outer circumferential surface of the photosensitive drum 31. Specifically, the transfer roller 34 has an outer circumferential surface that axially rotates and is opposed to the outer circumferential surface of the photosensitive drum 31 at a position on a downstream side relative to a developing roller 331 in a rotation direction of the photosensitive drum 31. The transfer roller 34 transfers the toner image carried on the outer circumferential surface of the photosensitive drum 31 to a sheet passing through a nip between itself and the outer circumferential surface of the photosensitive drum 31. During this transfer, a transfer voltage having a polarity opposite to that of the toner is applied to the transfer roller 34.

The fixing portion 40 performs fixing processing in which a toner image transferred to a sheet is fixed on the sheet. The fixing portion 40 includes a fixing roller 41 and a pressing roller 42. The fixing roller 41 includes therein a heating source and heats the toner transferred to the sheet at a prescribed temperature. The pressing roller 42 is brought into pressure contact with the fixing roller 41, thus forming a fixing nip between itself and the fixing roller 41. When the sheet to which the toner image has been transferred is passed through the fixing nip, the toner image is fixed on the sheet under heat applied by the fixing roller 41 and a pressure applied by the pressing roller 42.

In the main body housing 10, there are provided a main conveyance path 22F and an inversion conveyance path 22B, which are used for sheet conveyance. The main conveyance path 22F extends from the sheet feed-out portion 21A in the paper feed section 20 to a paper discharge port 14 provided to be opposed to the paper discharge portion 13 on the upper surface of the main body housing 10 via the image forming section 30 and the fixing portion 40. The inversion conveyance path 22B is a conveyance path used in duplex printing on a sheet, along which the sheet with one side thereof having been subjected to printing is conveyed back to an upstream side of the image forming section 30 in the main conveyance path 22F.

The main conveyance path 22F is provided to extend so as to pass upward from below through a transfer nip formed by the photosensitive drum 31 and the transfer roller 34. Furthermore, a registration roller pair 23 is disposed on an upstream side relative to the transfer nip in the main conveyance path 22F. At the registration roller pair 23, conveyance of a sheet is once stopped so that the sheet is subjected to skew correction, and then the sheet is sent out to the transfer nip at a prescribed timing for image transfer. At suitable locations in the main conveyance path 22F and the inversion conveyance path 22B, there is disposed a plurality of conveyance rollers used for sheet conveyance. A paper discharge roller pair 24 is disposed in a neighborhood of the paper discharge port 14.

The inversion conveyance path 22B is formed between an outside surface of an inversion unit 25 and an inner surface of the rear cover 12 of the main body housing 10. The transfer roller 34 and one of rollers constituting the registration roller pair 23 are mounted on an inside surface of the inversion unit 25. The rear cover 12 and the inversion unit 25 are each axially pivotable about a supporting point 121 provided at a lower end thereof. Upon occurrence of a jam (a paper jam) in the inversion conveyance path 22B, the rear cover 12 is opened. Upon occurrence of a jam in the main conveyance path 22F or in a case where a unit of the photosensitive drum 31 or the developing portion 33 is taken outside, not only the rear cover 12 but also the inversion unit 25 is opened.

(2. Configuration of Image Forming Section 30)

Figure 3:
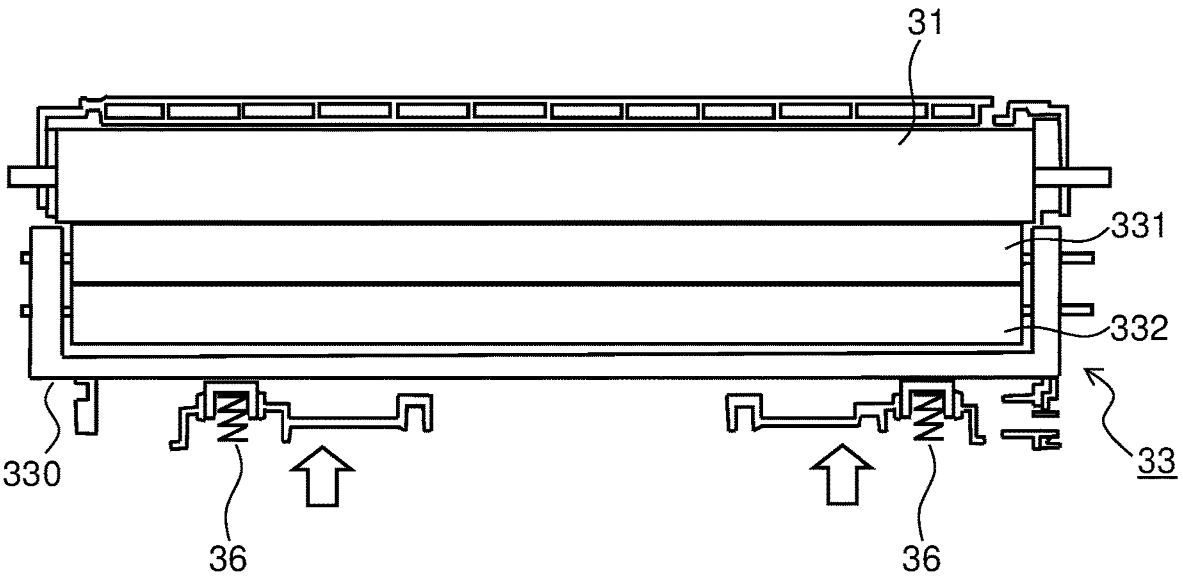
FIG. 3 is a plan view, as seen from above, of a vicinity of a contact part between a photosensitive drum and a developing roller of a developing portion.
Figure 4:
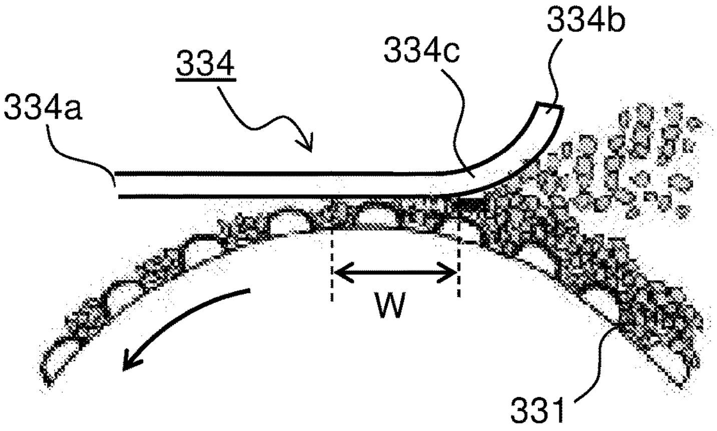
FIG. 4 is an enlarged sectional view of a vicinity of a contact part between the developing roller and a regulation blade in the developing portion.
Figure 5:
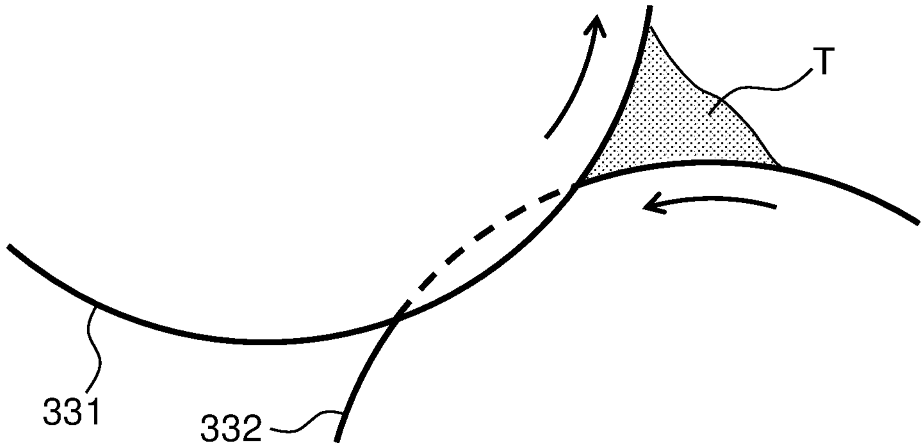
FIG. 5 is an enlarged sectional view of an abutment part of the developing roller and a supply roller.

FIG. 2 is a sectional view of the image forming section 30 in the image forming apparatus 1 of the present embodiment. FIG. 3 is a plan view, as seen from above, of a vicinity of a contact part between the photosensitive drum 31 and the developing roller 331 of the developing portion 33. FIG. 4 is an enlarged sectional view of a vicinity of a contact part between the developing roller 331 and a regulation blade 334 in the developing portion 33. FIG. 5 is an enlarged sectional view of an abutment part of the developing roller 331 and a supply roller 332.

As shown in FIG. 2 and FIG. 3, the developing portion 33 includes a development housing 330 (a development container), the developing roller 331 (a developer carrying member), the supply roller 332 (toner supply member), an agitation paddle 333, and the regulation blade 334.

The development housing 330 contains therein a non-magnetic one-component developer composed only of a toner and houses the developing roller 331, the supply roller 332, the regulation blade 334, and so on. The development housing 330 includes an agitation chamber 335 for containing the developer (the toner) in an agitated state. The agitation paddle 333 is disposed in the agitation chamber 335. The agitation paddle 333 is used to agitate the toner in the agitation chamber 335.

The developing roller 331 includes a rotary shaft 331*a* and a roller portion 331*b*. The rotary shaft 331*a* is rotatably supported to bearings (not shown) provided in the development housing 330. The roller portion 331*b* is a cylindrical member stacked on an outer circumferential surface of the rotary shaft 331*a* and is configured by stacking, on a surface of a base rubber (for example, silicone rubber), a coat layer formed of an uneven coating material such as urethane. The roller portion 331*b* rotates integrally with the rotary shaft 331*a* as the rotary shaft 331*a* rotates. A toner layer (a developer layer) having a prescribed thickness is formed on a surface of the roller portion 331*b*. A thickness of the toner layer is regulated (uniformly adjusted to a prescribed thickness) by the after-mentioned regulation blade 334. The toner layer is charged with static electricity generated by the abutment (friction) between the regulation blade 334 on the roller portion 331*b*.

At a position opposed to the photosensitive drum 31, the developing roller 331 rotates in a direction (a counterclockwise direction in FIG. 2) directed from an upstream side to a downstream side in a rotation direction of the photosensitive drum 31 (a clockwise direction in FIG. 2). That is, at the position opposed to the photosensitive drum 31, the developing roller 331 rotates in the same direction as the rotation direction of the photosensitive drum 31.

The supply roller 332 is disposed to be opposed to the developing roller 331. The supply roller 332 holds, on an outer circumferential surface thereof, the developer contained in the agitation chamber 335. Furthermore, the supply roller 332 supplies the developer held on the outer circumferential surface thereof to the developing roller 331.

At a position opposed to the developing roller 331, the supply roller 332 rotates in a direction (the counterclockwise direction in FIG. 2) directed from a downstream side to an upstream side in the rotation direction of the developing roller 331 (the counterclockwise direction in FIG. 2). That is, at the position opposed to the developing roller 331, the supply roller 332 rotates in an opposite direction to the rotation direction of the developing roller 331. In order to cause the toner to move from the supply roller 332 to the developing roller 331, a prescribed supply voltage (a direct-current voltage) is applied to the supply roller 332.

The developing roller 331 is supplied with the developer from the supply roller 332 and holds the toner layer on an outer circumferential surface thereof. Further, the developing roller 331 supplies the developer to the photosensitive drum 31. The developing roller 331 and the supply roller 332 each have a length in an axial direction (a direction orthogonal to a drawing plane of FIG. 2) substantially equal to a length of the photosensitive drum 31 in the axial direction. In order to cause the toner to move from the developing roller 331 to the photosensitive drum 31, a prescribed development voltage (a direct-current voltage) is applied to the developing roller 331.

In the image forming section 30, a pressing mechanism 36 composed of a pressing member 361 and a pressing spring 362 is disposed on an opposite side to the photosensitive drum 31 via the development housing 330 (a lower right side in FIG. 2, a lower side in FIG. 3). The pressing mechanism 36 is disposed at each of two locations on the development housing 330 along a longitudinal direction thereof (at positions 85 mm away from a center of the photosensitive drum 31 in the axial direction). When the developing portion 33 is attached to the image forming section 30, the development housing 330 is brought into pressure contact with the pressing member 361 and thus is pressed in a direction toward the photosensitive drum 31 (an upper left direction in FIG. 2, an upper direction in FIG. 3), so that the developing roller 331 is pressed at a prescribed pressing force to the photosensitive drum 31. In the present embodiment, the developing portion 33 and the photosensitive drum 31 have no mechanism for regulating a distance between the developing roller 331 and the photosensitive drum 31, namely, no mechanism for regulating a pressing force of the developing roller 331 with respect to the photosensitive drum 31.

However, a mechanism may be provided which regulates the pressing force of the developing roller 331 with respect to the photosensitive drum 31.

The regulation blade 334 is a thin plate-shaped member made of metal. The regulation blade 334 is configured so that a proximal end 334*a* thereof is secured to the development housing 330 and a distal end 334*b* thereof is a free end. At a position on an upstream side relative to a position at which the photosensitive drum 31 is opposed to the developing roller 331 in the rotation direction of the developing roller 331, the regulation blade 334 contacts the outer circumferential surface of the developing roller 331.

The regulation blade 334 is flexibly deformable, and there is a contact part (a nip) between the reregulate blade 334 and the developing roller 331 in a circumferential direction of the developing roller 331. The regulation blade 334 abuts on the outer circumferential surface of the developing roller 331 (the roller portion 331*b*) at a prescribed regulation pressure and with a prescribed nip width W. A prescribed regulation voltage (a direct-current voltage) may be applied to the regulation blade 334 as will be described later.

The regulation blade 334 is made of, for example, stainless steel (SUS304) and has a free length of 10 mm in the present embodiment. The distal end 334*b* of the regulation blade 334 is bent so that a curved part 334*c* is formed. The curved part 334*c* abuts on the outer circumferential surface of the developing roller 331. The curved part 334*c* has a radius of curvature of not less than 0.1 mm.

As shown in FIG. 4, the regulation blade 334 abuts on the developing roller 331 at a prescribed regulation pressure (contact linear pressure), and thus the toner layer carried on the outer circumferential surface of the developing roller 331 is adjusted to be uniform in thickness. With this configuration, the regulation blade 334 regulates an amount of toner on the outer circumferential surface of the developing roller 331. Furthermore, the regulation blade 334 rubs on the toner carried on the outer circumferential surface of the developing roller 331 and thus charges the toner. The contact linear pressure of the regulation blade 334 with respect to the developing roller 331 refers to a contact pressure per unit length of the regulation blade 334 at a contact position between the regulation blade 334 and the outer circumferential surface of the developing roller 331.

As shown in FIG. 5, at the abutment part (nip) of the developing roller 331 and the supply roller 332, the developing roller 331 bites into the supply roller 332. A toner pool T is formed on the downstream side of the nip (an upper right side in FIG. 5) with respect to the rotation direction of the developing roller 331.

It is known that when the developing roller 331 and the supply roller 332 are in line contact at the nip, the toner pool T is not formed, and thus toner supply performance is significantly lowered. Hence, it is necessary to design a distance between axes, the diameters, and the hardnesses of the developing roller 331 and the supply roller 332 such that the developing roller 331 and the supply roller 332 have an appropriate amount of bite. Since the developing roller 331 makes contact with the hard member of the photosensitive drum 31, the developing roller 331 is designed to have an Asker C hardness of about 50 to 80. Therefore, in order to cause the developing roller 331 to bite into the supply roller 332, it is necessary to drop the hardness of the supply roller 332 below the developing roller 331.

A potential difference between the supply roller 332 and the developing roller 331 is generated, and thus electric field energy is generated in a direction in which the toner moves from the supply roller 332 to the developing roller 331. Van der Waals forces act between toner particles regardless of the potential difference. The toner is supplied from the supply roller 332 to the developing roller 331 by the electric field energy and the Van der Waals forces described above. In order to enhance the density followability of a solid image (that is, there is no density difference between a tip end and a rear end of the image), it is also important that a compressive load which is a force for pressing the supply roller 332 against the developing roller 331 be adjusted within an optimum range.

(3. Control Paths of Image Forming Apparatus 1)

Figure 6:
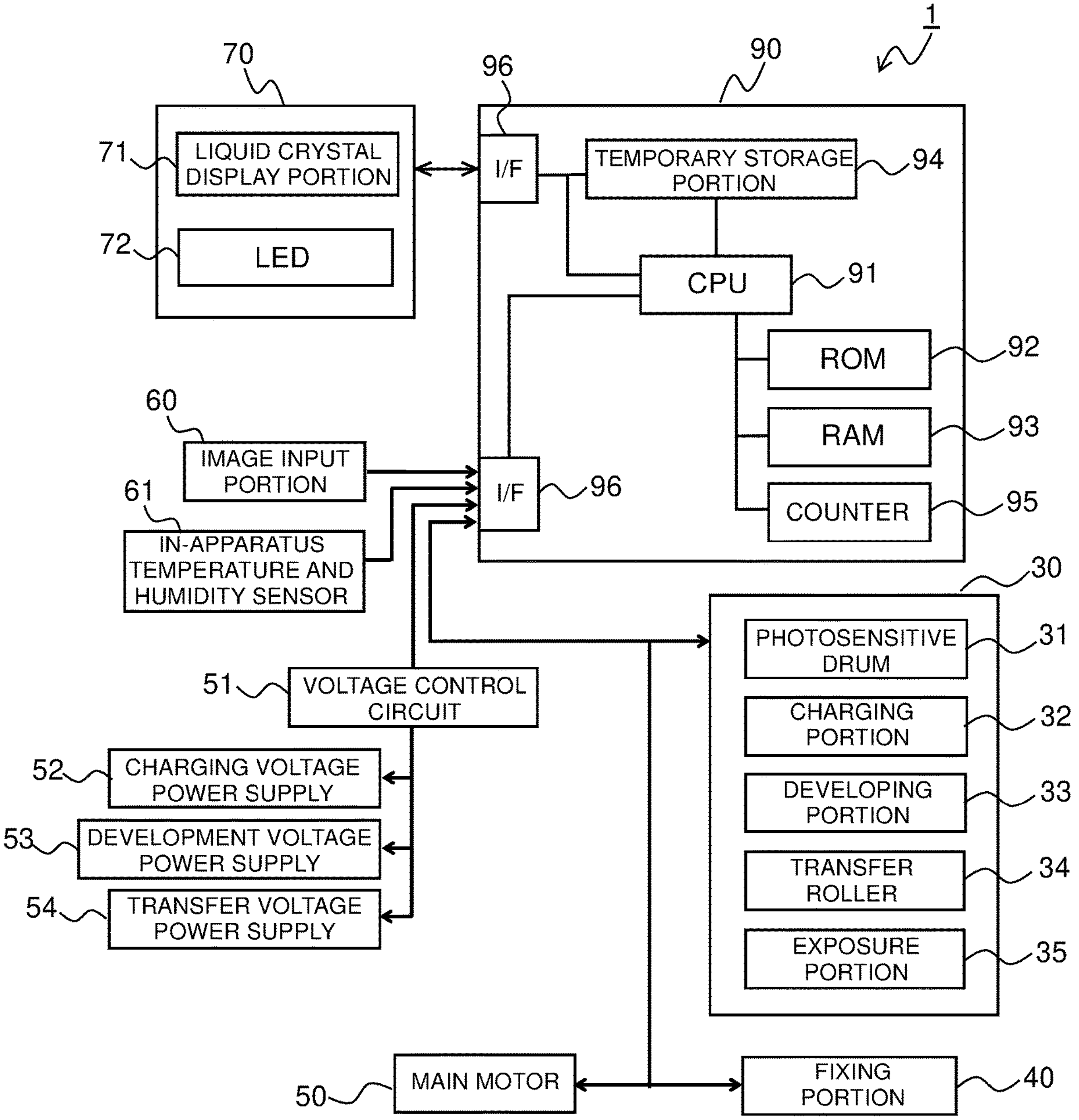
FIG. 6 is a block diagram showing an example of control paths used in the image forming apparatus of the present embodiment.

FIG. 6 is a block diagram showing an example of control paths used in the image forming apparatus 1 of the present embodiment. In using the image forming apparatus 1, the various portions therein are controlled in different ways, and thus the image forming apparatus 1 as a whole has complicated control paths. Thus, herein, a description of the control paths is made with emphasis on some of the control paths required for implementing the present disclosure.

Based on output signals from a control section 90, a main motor 50 drives to rotate, in addition to the paper feed roller 21B and the photosensitive drum 31, the developing roller 331, the supply roller 332, and the agitation paddle 333 in the developing portion 33, the fixing roller 41 in the fixing portion 40, and so on at prescribed respective rotation speeds.

A voltage control circuit 51 is connected to a charging voltage power supply 52, a development voltage power supply 53, and a transfer voltage power supply 54 and, based on output signals from the control section 90, operates these power supplies. Based on a control signal from the voltage control circuit 51, the charging voltage power supply 52 applies a charging voltage to the charge wire 321 in the charging portion 32. The development voltage power supply 53 applies a development voltage to the developing roller 331 in the developing portion 33 and a supply voltage to the supply roller 332 in the developing portion 33. When the regulation voltage is applied to the regulation blade 334 in the developing portion 33, the development voltage power supply 53 applies the regulation voltage to the regulation blade 334. The transfer voltage power supply 54 applies a transfer voltage to the transfer roller 34.

An image input portion 60 is a reception portion that receives image data transmitted from a personal computer or the like to the image forming apparatus 1. An image signal inputted from the image input portion 60 is converted into a digital signal, which then is sent out to a temporary storage portion 94.

An in-apparatus temperature and humidity sensor 61 detects a temperature and a humidity inside the image forming apparatus 1, particularly a temperature and a humidity in a vicinity of the developing portion 33, and is disposed in a neighborhood of the image forming section 30.

An operation section 70 is provided with a liquid crystal display portion 71 and an LED 72 that indicates various states and thus functions to indicate a status of the image forming apparatus 1 and to display an image forming situation and the number of printed copies. Various settings for the mage forming apparatus 1 are made via a printer driver of a personal computer.

The control section 90 includes at least a CPU (central processing unit) 91 as a central computation processor, a ROM (read-only memory) 92 that is a read-only storage portion, a RAM (random-access memory) 93 that is a readable and writable storage portion, the temporary storage portion 94 that temporarily stores image data and so on, a counter 95, and a plurality of (herein, two) I/Fs (interfaces)

96 that transmits control signals to the various devices in the image forming apparatus 1 and receives input signals from the operation section 70.

The ROM 92 stores, for example, data not to be changed during use of the image forming apparatus 1, such as control programs for the image forming apparatus 1 and numerical values required for control. The RAM 93 stores, for example, data necessitated when control of the image forming apparatus 1 is in progress and data temporarily required for controlling the image forming apparatus 1.

The temporary storage portion 94 temporarily stores an image signal inputted from the image input portion 60, which receives image data transmitted from a personal computer or the like, and converted into a digital signal. The counter 95 cumulatively counts the number of printed sheets.

Furthermore, the control section 90 transmits control signals from the CPU 91 to the various portions and devices in the image forming apparatus 1 via the I/Fs 96. Furthermore, from the various portions and devices, signals indicating respective statuses thereof and input signals are transmitted to the CPU 91 via the I/Fs 96. Examples of the various portions and devices controlled by the control section 90 include the image forming section 30, the fixing portion 40, the main motor 50, the voltage control circuit 51, the image input portion 60, and the operation section 70.

(4. Setting of Developing Portion in Image Forming Operation)

The setting of the developing portion 33 during image formation (development) which is a feature of the image forming apparatus 1 of the present embodiment will be described below. In the present embodiment, when the amount of toner conveyed on the developing roller 331 and regulated by the regulation blade 334 is Md [g/m$^2$], the amount of toner adhered on the photosensitive drum 31 in a solid image (image density of 100%) by movement of the toner from the developing roller 331 to the photosensitive drum 31 due to the development voltage is Mp [g/m$^2$], the peripheral speed of the developing roller 331 is Sd [mm/sec], and the peripheral speed of the photosensitive drum 31 is Sp [mm/sec], formulae (1) and (2) below are satisfied, and the resistance value (hereinafter simply referred to as the roller resistance) of the roller portion 331*b* of the developing roller 331 is 9 to 11 [Log Ω].

$$0.8\times Sd/Sp<Mp/Md \quad (1)$$

$$0.8\leq Sd/Sp\leq 1.2 \quad (2)$$

Formula (1) indicates an appropriate relationship between the ratio (development ratio) Mp/Md of the amount Mp of toner adhered on the photosensitive drum 31 to the amount Md of toner conveyed on the developing roller 331 and a peripheral speed ratio (linear speed ratio) Sd/Sp of the developing roller 331 to the photosensitive drum 31. A result obtained by multiplying the peripheral speed ratio Sd/Sp by a coefficient of 0.8 is set lower than Mp/Md, and thus the number of rotations of the developing roller 331 is reduced, and physical stress applied to the toner can be further suppressed. Furthermore, even in a state where the development voltage is fixed, a stable image density can be secured.

Formula (2) indicates an appropriate range of the peripheral speed ratio Sd/Sp of the developing roller 331 to the photosensitive drum 31. When Sd/Sp is excessively lowered, the amount Mp of toner adhered is decreased, and thus the uniformity (granularity) of the solid images is lowered. On the other hand, when Sd/Sp is excessively increased, the amount Mp of toner adhered is increased, and thus image stability is lowered when a variation in an image portion potential VL is produced. Sd/Sp is set in a range equal to or greater than 0.8 and equal to or less than 1.2, and thus it is possible to enhance the uniformity (granularity) of the solid image while the amount of toner adhered in the solid image is being sufficiently secured.

When Sd/Sp is closer to 1, a peripheral speed difference between the developing roller 331 and the photosensitive drum 31 is decreased, and thus it is difficult for the toner to move between the developing roller 331 and the photosensitive drum 31. Consequently, the toner adhered to a white background of the photosensitive drum 31 is not returned to the developing roller 331, and thus fogging easily occurs.

As shown in test results to be described later, the conditions of formulae (1) and (2) are further narrowed down, and formulae (3) and (4) below are satisfied, with the result that it is possible to achieve satisfactory image formation in which the fogging and the granularity are further improved.

$$0.9\times Sd/Sp<Mp/Md \quad (3)$$

$$0.8\leq Sd/Sp\leq 0.9 \text{ or } 1.1\leq Sd/Sp\leq 1.2 \quad (4)$$

The amount Md of toner conveyed is set high in order to suppress physical stress on the toner in a regulation nip and a development nip, and is preferably set in a range of 5≤Md≤10. Md is set high, and thus stress is relieved in a thin toner layer, with the result that it is possible to reduce stress not only in the regulation nip but also in the development nip. Hence, the generation of a white streak image in durable printing is suppressed, and thus it is possible to further enhance image quality.

The amount Mp of toner adhered is set low in terms of low-temperature fixing, and is preferably set in a range of 3≤Mp≤7. Md can be adjusted by the regulation condition (contact linear pressure) of the regulation blade 334, the change of the supply voltage or the regulation voltage, the surface roughness of the developing roller 331 or the like.

In the present embodiment, the control section 90 and the voltage control circuit 51 changes at least one of the supply voltage and the regulation voltage according to a change in a specific condition which produces a variation in the amount Mp of toner adhered on the photosensitive drum 31. As an example of the specific condition, a temperature and a humidity in the vicinity of the image forming apparatus 1 or the developing portion 33 are mentioned. In this case, the in-apparatus temperature and humidity sensor 61 (see FIG. 6) provided in the main body housing 10 of the image forming apparatus 1 detects the temperature and the humidity, and transmits detection results to the control section 90.

As another example of the specific condition, a system speed (also called a process speed) is mentioned. The system speed can also be said to be the peripheral speed Sp of the photosensitive drum 31. By the conditions such as the environment (the temperature and the humidity) as described above and the system speed, a variation in the amount Md of toner conveyed is produced, and thus it is difficult to secure a stable image density with Sd/Sp which is fixed. Hence, as described above, for the condition where the variation in Md is previously known, the voltage control circuit 51 changes the supply voltage or the regulation voltage to correct the amount Md of toner conveyed, and thus a more stable image density is secured, with the result that it is possible to perform stable image formation.

In particular, in the present embodiment, the voltage control circuit 51 controls the regulation voltage and the supply voltage such that a potential difference with the development voltage is changed within a range equal to or greater than 0V and equal to or less than 200V. There is a tendency that as the potential difference is increased, Md is increased, and furthermore, Md can be significantly changed by the supply voltage as compared with the regulation voltage.

For example, a case where a change in Md caused by the environment is corrected by the supply voltage will be described. Although the supply voltage is set to 100 V in a high temperature and high humidity environment, and thus Md=4 g/m$^2$, the supply voltage is set to 150 V, and thus it is possible to make an adjustment such that Md=4.8 g/m$^2$. Likewise, although the supply voltage is set to 100 V in a low temperature and low humidity environment, and thus Md=6 g/m$^2$, the supply voltage is set to 50 V, and thus it is possible to make an adjustment such that Md=5.2 g/m$^2$. As described above, when the supply voltage is adjusted according to the change of the environment, the amount of toner supplied is changed by the potential difference between the supply roller 332 and the developing roller 331, with the result that it is possible to adjust Md. The correction described above may be performed by adjusting the regulation voltage.

On the other hand, a case where the system speed (the peripheral speed SP of the photosensitive drum 31) is changed will be described. The change of the system speed as described above is performed, for example, when as in a thick paper mode, a sheet made of thick paper is slowly passed through the fixing portion 40 in order to reliably fix the toner on the thick paper. Although when the supply voltage is set to 100 V in a plain paper mode (system speed of 120 mm/sec), Md=5 g/m$^2$, when the supply voltage is set to 100 V in the thick paper mode (system speed of 90 mm/sec), Md=4.5 g/m$^2$. Hence, when the supply voltage is set to 120 V, it is possible to make an adjustment such that Md=4.9 g/m$^2$. As described above, when the supply voltage is adjusted according to the change of the system speed, the amount of toner supplied is changed by the potential difference between the supply roller 332 and the developing roller 331, with the result that it is possible to adjust Md. The correction described above may be performed by adjusting the regulation voltage.

As described above, in the present embodiment, even when the conditions such as the environment and the system speed are changed, and thus the amount Md of toner adhered is easily changed, the voltage control circuit 51 changes the supply voltage and the regulation voltage to correct the amount of toner conveyed, and thus a more stable image density is secured without any change of the setting of Sd/Sp, with the result that it is possible to perform stable image formation.

As the roller resistance of the developing roller 331 is increased, the adhesion of the toner is lowered, and thus image uniformity is enhanced. On the other hand, when the resistance value of the developing roller 331 is excessively increased, it is difficult to apply the development voltage. Consequently, an effective electric field between the developing roller 331 and the supply roller 332 is decreased, and thus the toner supply performance is lowered. The roller resistance of the developing roller 331 is set to 9 to 11 [Log Ω], and thus while the toner supply performance is being maintained, even in a region where the amount Mp of toner adhered is high, the image stability when a variation in the image portion potential VL is produced can be secured.

Furthermore, in the present embodiment, the roller portion 331*b* of the developing roller 331 does not include an electronic conductive agent represented by carbon or metal oxide such as titanium oxide and an ionic conductive agent such as a quaternary ammonium salt, and is configured to achieve the resistance value described above by only the conductivity of a resin such as nylon or urethane which is a material of the coat layer. In this way, the dielectric constant of the coat layer can be kept low, and the hydrophilicity can be lowered. Consequently, even in a low temperature and low humidity environment after durable printing, the uniformity (granularity) of the solid images is secured, and the occurrence of fogging can be suppressed.

In the present embodiment, it is assumed that as a non-magnetic toner, a low-temperature fixing toner is used. More specifically, the melt viscosity [Pa·s] of the toner contained in the development housing 330 at 95° C. is preferably equal to or greater than 10,000 and equal to or less than 200,000. In a range exceeding the upper limit of the melt viscosity which is 200,000, it is possible to easily maintain the image quality even when the conditions of the peripheral speed ratio Sd/Sp and the development ratio Mp/Md in the present embodiment are not set. However, power necessary for fixing processing is increased beyond power in the present embodiment. The toner in which the melt viscosity is less than the lower limit of 10,000 is difficult to use for manufacturing reasons.

(5. Image Evaluation by Setting of Developing Portion)

The result of an image evaluation when a developing portion 33 was set as in the present embodiment will be described below. A durability printing test was first performed while changing printing conditions (the type of developing roller 331, the amount Md of toner conveyed, the peripheral speed ratio Sd/Sp and the development ratio Mp/Md), and effects for the occurrence of fogging and the uniformity (granularity) of a solid image were verified. As a test machine, an image forming apparatus 1 (made by KYOCERA Document Solutions Inc.) as shown in FIG. 1 was used.

Figure 7:
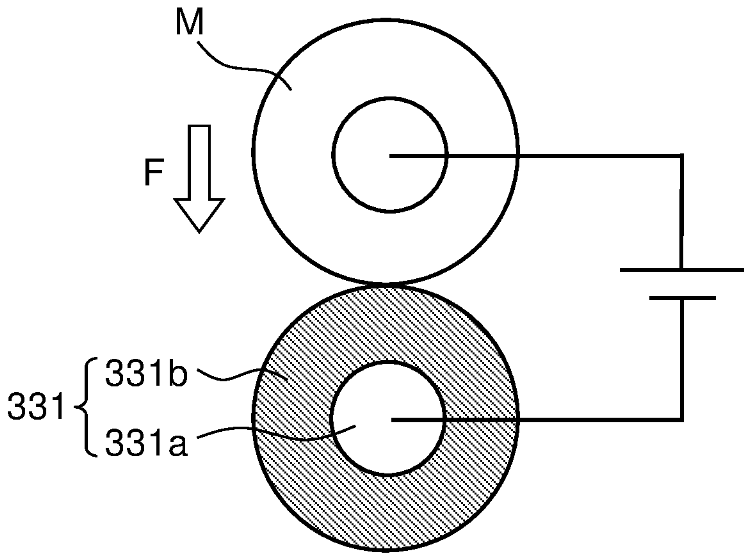
FIG. 7 is a diagram showing a method for measuring the roller resistance of the developing roller.

As the developing roller 331, a roller was used that included a rotary shaft 331*a* having a shaft diameter of 6 mm and a roller portion 331*b* in which a silicone rubber layer serving as a base layer with a thickness of 3.5 mm was coated and which had an outside diameter of 13 mm and a length in an axial direction of 232 mm, and that had an Asker C hardness of 55°. As the coating, the silicone rubber layer was coated 5 μm with 100 parts by weight of a copolymerized nylon resin and a mixture obtained by adding 1 part by weight of carbon black or quaternary ammonium salt to 100 parts by weight of the copolymerized nylon resin, and thus the roller resistance was adjusted to be 9 to 11 [Log Ω]. As shown in FIG. 7, a load F of 1 kg was applied to a metal roller M, the metal roller M was brought into contact with the developing roller 331 and was stopped, and in this state, a direct-current voltage of 100 V was applied between the developing roller 331 and the metal roller M, with the result that the roller resistance was measured.

The surface roughness Rz of the developing roller 331 was set to 4 to 10 μm by adjusting the roughness of the roller portion 331*b* with polishing conditions. The Asker C hardness was measured using a constant pressure loader (CL-150, made by KOBUNSHI KEIKI CO., LTD.).

As a photosensitive drum 31, a positively charged single-layer OPC photosensitive drum (made by KYOCERA Document Solutions Inc.) having an outer diameter of 24 mm and a photosensitive layer thickness of 22 μm was used.

(Relationship Between Sd/Sp and Md/Mp and Image Density Variation)

An image density variation was first investigated when a relationship between the peripheral speed ratio Sd/Sp and the development ratio Md/Mp was changed. As a test method, under the test conditions described above, the amount Md of toner conveyed was previously set to 6 [g/m$^2$], and the development voltage was adjusted to change the value of the amount Mp of toner adhered. Thereafter, in a state where the adjusted development voltage was fixed, an image density variation when the solid image portion potential VL of the photosensitive drum 31 was changed to 80 to 140 V was evaluated. The evaluation criteria were represented by crosses when the image density variation was 15% or more and represented by circles when the image density variation was within 15%. The results are shown in FIG. 8.

Figure 8:
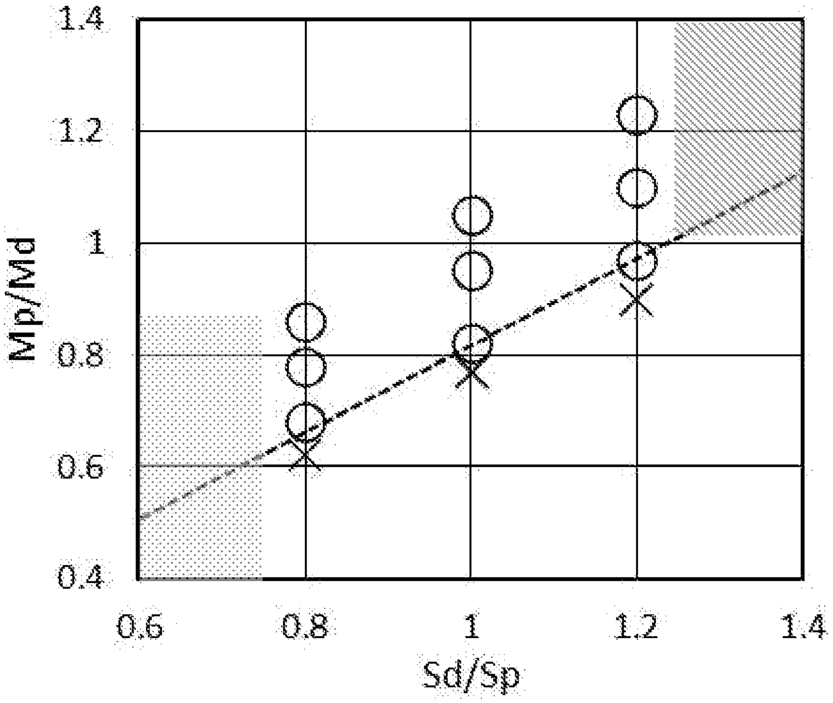
FIG. 8 is a graph showing the result of an image evaluation when a relationship between a peripheral speed ratio Sd/Sp and a development ratio Md/Mp was changed in the image forming apparatus.

When as shown in FIG. 8, the relationship between Sd/Sp and Md/Mp was located above a dashed line (0.8×Sd/Sp=Mp/Md), even if the image portion potential VL of the photosensitive drum 31 was changed, a stable image density was able to be maintained. When Sd/Sp was less than 0.8 (a dotted region in FIG. 8), the uniformity (granularity) of the solid image deteriorated. When Sd/Sp exceeded 1.2 (a hatched region in FIG. 8), image stability deteriorated. Therefore, it has been confirmed that when 0.8×Sd/Sp<Mp/Md and 0.8≤Sd/Sp≤1.2 are satisfied, even if the image portion potential VL is changed, while a stable image density is being maintained, the uniformity and the image stability of the solid image can be secured.

(Relationship Between Amount Md of Toner Conveyed and White Streak Image)

A relationship between the amount Md of toner conveyed and a white streak image was then investigated. In a test method, standard data (character pattern with a print ratio of 3.9%) specified in ISO/IEC 19752 was output in an A4 size as a test image, and whether or not a white streak image was generated in the output test image was visually checked. The life of the developing portion 33 was determined by the cumulative number of printed sheets in one of two cases which has occurred first, the two cases were a case where the toner in the developing portion 33 was empty and a case where characters in the output test image were cut off due to deterioration of the white streak image, and a target value was set to 1500 sheets. The results are shown in FIG. 9.

Figure 9:
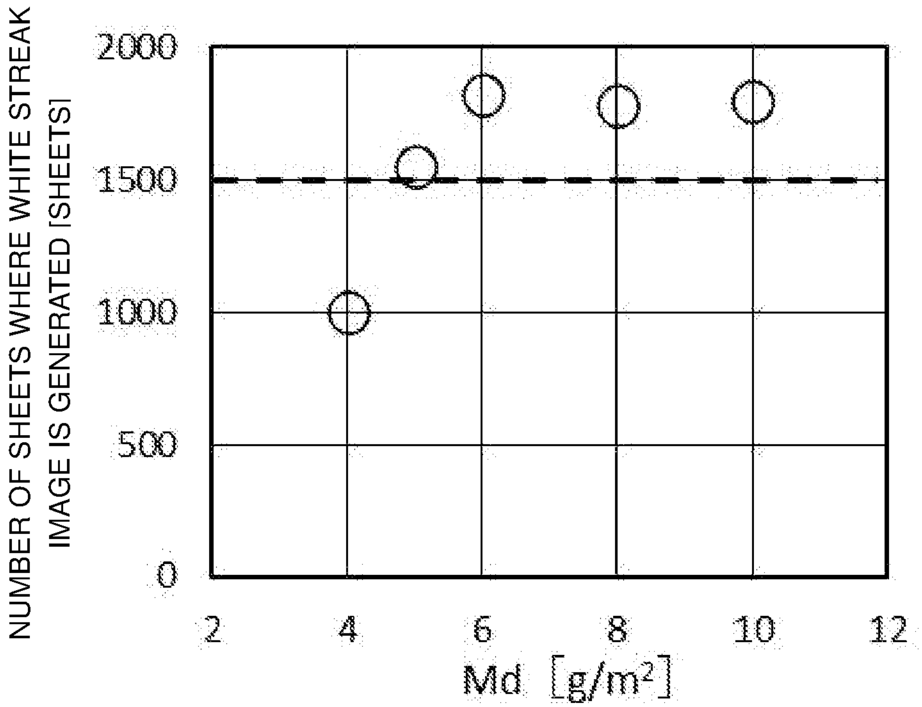
FIG. 9 is a graph showing a relationship between the amount Md of toner conveyed on the developing roller and the generation of a white streak image.

As shown in FIG. 9, when the amount Md of toner conveyed was less than 5 [g/m$^2$], a white streak image was generated in less than 1500 sheets which was the target value for the life of the developing portion 33. On the other hand, when the amount Md of toner conveyed exceeded 10 [g/m$^2$], the amount Md of toner conveyed was excessively increased, with the result that the stability of the amount of toner conveyed was lowered. Moreover, the amount of toner adhered (transferred) on the sheet was increased, and thus the fixability was lowered. Therefore, it has been confirmed that when 5≤Md≤10 is satisfied, while a white streak image is being suppressed, the image stability and the fixability can be improved.

(Relationship Between Sd/Sp and Image Quality in High Temperature and High Humidity Environment)

A relationship between the peripheral speed ratio Sd/Sp of the developing roller 331 to the photosensitive drum 31 and image quality in a high temperature and high humidity environment was then investigated. In a test method, fogging in a white background and the uniformity (granularity) of a solid image when in a high temperature and high humidity environment (HH environment, 32.5° C., 80% RH), Sd/Sp was changed to 0.8 to 1.2 and the solid image (with a print ratio of 100%) was output were visually evaluated. The tests were performed for a case where the coefficient by which Sd/Sp was multiplied in formula (1) was set to 0.8 and a case where the coefficient was set to 0.9. The evaluation criteria were represented by circles when no fogging occurred and represented by triangles when acceptable fogging occurred. For the granularity, the evaluation criteria were represented by circles when the solid image was uniform and represented by triangles when the solid image was slightly nonuniform though acceptable. The results are shown in Table 1.

TABLE 1

| Coefficient | Evaluation item | Sd/Sp 0.8 | 0.9 | 1 | 1.1 | 1.2 |
|---|---|---|---|---|---|---|
| 0.8 | Fogging | ○ | ○ | Δ | ○ | ○ |
| | Granularity | Δ | Δ | Δ | Δ | Δ |
| 0.9 | Fogging | ○ | ○ | Δ | ○ | ○ |
| | Granularity | ○ | ○ | ○ | ○ | ○ |

As shown in Table 1, in a case where the coefficient was set to 0.8, when 0.8≤Sd/Sp≤0.9, no fogging occurred but when Sd/Sp=1, fogging slightly occurred. When 0.8≤Sd/Sp≤1.2, the uniformity (granularity) of the solid image was slightly nonuniform.

On the other hand, in a case where the coefficient was set to 0.9, the fogging was the same as in the case where the coefficient was set to 0.8 but when 0.8≤Sd/Sp≤1.2, the uniformity (granularity) of the solid image was uniform. Therefore, it has been confirmed that when formulae (1) and (2) are satisfied, it is possible to suppress the occurrence of fogging, and when formulae (3) and (4) are further satisfied, it is possible to effectively suppress not only the occurrence of fogging but also the lowering of the uniformity of a solid image.

(Relationship Between Whether or not Conductive Agent is Added to Coat Layer of Developing Roller and Image Quality)

A relationship between whether or not a conductive agent was added to the coat layer of the developing roller 311 and image quality was then investigated. In a test method, a developing roller 331 in which no conductive agent was added to the coat layer (developing roller A), a developing roller 331 in which 1 part by weight of carbon black serving as an electronic conductive agent was added to the coat layer (developing roller B), and a developing roller 331 in which 1 part by weight of a quaternary ammonium salt serving as an ionic conductive agent was added to the coat layer (developing roller C) were prepared. The roller resistance of the developing roller 331 was adjusted to be 9.5 [Log Ω]. Test machines in which these developing rollers 331 were fitted to the developing portions 33 were used, 1500 sheets of test images (with a print ratio of 5%) were continuously output, then the test images were output in a high temperature and high humidity environment (HH environment, 32.5° C., 80% RH), and fogging and the uniformity (granularity) of a solid image were visually evaluated. Criteria were the same as in Table 1. The results are shown in Table 2.

TABLE 2

| | Electronic conductive agent | Ionic conductive agent | Granularity | Fogging |
|---|---|---|---|---|
| Developing roller A | Not provided | Not provided | ○ | ○ |
| Developing roller B | Provided | Not provided | Δ | Δ |
| Developing roller C | Not provided | Provided | ○ | Δ |

As shown in Table 2, when the developing roller A in which no conductive agent was added to the coat layer was used, the uniformity of the solid image was secured, and the fogging was suppressed. On the other hand, when the developing roller B in which the electronic conductive agent was added to the coat layer was used, the uniformity of the solid image deteriorated, and fogging occurred. When the developing roller C in which the ionic conductive agent was added to the coat layer was used, the uniformity of the solid image was secured but fogging occurred. Therefore, it has been confirmed that only the conductivity of a resin such as nylon or urethane which was a material of the coat layer was provided, thus the roller resistance was set to 9 to 11 [Log Ω], and consequently, even in a high temperature and high humidity environment after durable printing, the uniformity (granularity) of the solid image is secured and it is possible to suppress the occurrence of fogging.

(6. Other Configurations)

Figure 10:
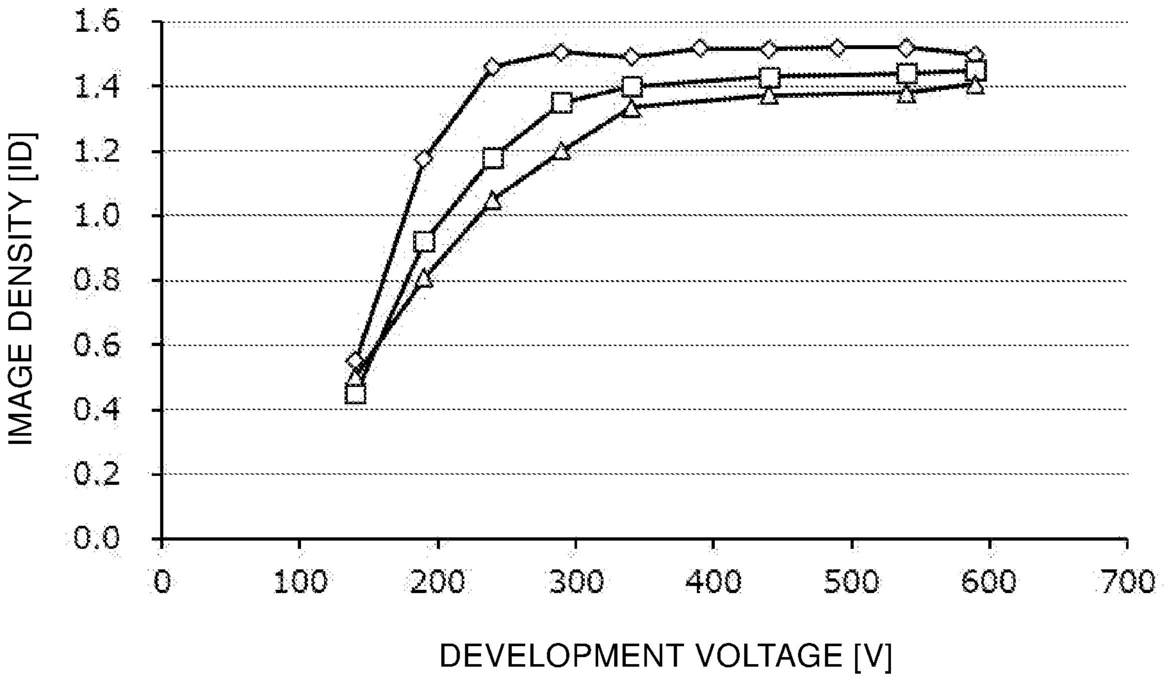
FIG. 10 is a graph showing a relationship between a development voltage applied to the developing roller and an image density (ID) when a surface free energy of the developing roller is changed.

FIG. 10 is a graph showing a relationship between a development voltage applied to the developing roller 331 and an image density (ID) when a surface free energy of the developing roller 331 is changed. The surface free energy corresponds to a surface tension of a liquid in a solid and refers to a molecular energy of a surface itself of the solid. In FIG. 10, a data series denoted with rhombuses indicates a case where the developing roller 331 has a surface free energy of 12 $mJ/m^2$, a data series denoted with squares indicates a case where the developing roller 331 has a surface free energy of 21 $mJ/m^2$, and a data series denoted with triangles indicates a case where the developing roller 331 has a surface free energy of 30 $mJ/m^2$.

As shown in FIG. 10, the higher the surface free energy of the developing roller 331, the more a development voltage usable range OW tends to be narrowed. This is because an upper limit value of such a pressing force of the developing roller 331 that white voids occur in a half-tone image decreases with increasing surface free energy of the developing roller 331. Preferably, the developing roller 331 has a surface free energy equal to or greater than 5 $mJ/m^2$ and equal to or less than 27 $mJ/m^2$.

Furthermore, the amount of toner regulated by the regulation blade 334 is also changed by a contact area ratio of the outer circumferential surface of the developing roller 331. The contact area ratio of the outer circumferential surface of the developing roller 331 refers to a ratio of an area of a region on the outer circumferential surface of the developing roller 331 excluding a concave (a non-contact part) to an area of the outer circumferential surface thereof. That is, the contact area ratio of the circumferential surface of the developing roller 331 indicates a true contact area between the outer circumferential surface of the developing roller 331 and the regulation blade 334 with respect to an apparent contact area therebetween. The contact area ratio is preferably 4.5% to 10% and more preferably 6% to 8%.

A regulation pressure of the regulation blade 334 is preferably 10 N/m to 60 N/m and more preferably 20 N/m to 40 N/m. There is no particular limitation on a method for manufacturing the developing roller 331, and the surface roughness of the developing roller 331 may be adjusted by coating the developing roller 331 with a coat layer containing particles or may be adjusted merely by polishing.

Furthermore, in the present embodiment, both of a toner (a pulverized toner) manufactured by a pulverization method and a toner (a polymerized toner) manufactured by a polymerization method can be used. Due to its truly spherical shape having a high circularity, the polymerized toner is low in adhesion force to provide good development performance and thus has a broader usable range OW. The present disclosure is, therefore, particularly useful in the non-magnetic one-component development type that uses the pulverized toner less costly than the polymerized toner.

Furthermore, in the present embodiment, it has been confirmed that the use of a toner having a central particle diameter of 6.0 μm to 8.0 μm provides excellent results. The reason for selecting a central particle diameter in this range is as follows. Specifically, a central particle diameter outside this range is not preferable in that a central particle diameter smaller than 6.0 μm leads to an increase in the manufacturing cost of the toner, and a central particle diameter larger than 8.0 μm leads to an increase in the consumption amount of toner and thus to deterioration in fixability.

Furthermore, in the present embodiment, it has been confirmed that the use of a toner having a circularity of 0.93 to 0.97 provides excellent results. A circularity outside this range is not preferable for the following reasons. Specifically, a circularity equal to or greater than 0.93 tends to decrease image quality. A circularity equal to or greater than 0.97 leads to a significant increase in the manufacturing cost.

Furthermore, in the present embodiment, it has been confirmed that the use of a toner having a melt viscosity equal to or less than 100,000 Pa s at 90° C. provides excellent results. A melt viscosity exceeding 100,000 Pa s at 90° C. leads to deterioration in fixability of the toner and thus is not preferable from the standpoint of energy saving.

Furthermore, it has been confirmed that a surface potential VO in a range of 500 V to 800 V and a post-exposure potential VL in a range of 70 V to 200 V of the photosensitive drum 31 provide similar effects.

Other than the above, the present disclosure is not limited to the foregoing embodiment and can be variously modified without departing from the spirit of the present disclosure. For example, although the foregoing embodiment has described a monochrome printer as an example of the image forming apparatus 1, the present disclosure is applicable also to, for example, a color printer of a tandem type or a rotary type. Furthermore, the present disclosure is applicable also to an image forming apparatus such as a copy machine, a facsimile, or a multi-functional peripheral equipped with functions thereof. It is required, however, to include the photosensitive drum 31 and the developing portion 33 of the non-magnetic one-component development type. Although in the embodiment described above, the configuration in which the non-magnetic toner is stored within the development housing 330 of the developing portion 33 is described, a toner container or a toner cartridge for storing the non-magnetic toner may be provided separately from the development housing 330.

Furthermore, although the photosensitive drum 31 in the foregoing embodiment uses a cylindrical raw tube as a support, a support having any other shape may also be used. Examples of the other shape may include a plate shape and an endless belt shape. Furthermore, although the photosensitive drum 31 in the foregoing embodiment uses an organic photosensitive layer composed of an electric charge generation layer, an electric charge transport layer as the photosensitive layer, there may be provided, for example, an electric charge injection blocking layer that blocks injection of electric charges from the support.

The present disclosure can be utilized for an image forming apparatus which includes a developing device of a non-magnetic one-component development type using a non-magnetic toner. By the utilization of the present disclosure, it is possible to provide an image forming apparatus which can perform stable image formation in a configuration using the non-magnetic one-component development type even when the image portion potential of a photosensitive member is changed, and which can secure the uniformity of a solid image.

What is claimed is:

1. An image forming apparatus comprising:

an image carrying member that includes a photosensitive layer formed on a surface thereof;

a charging device that charges the image carrying member to a prescribed surface potential;

an exposure device that exposes the surface of the image carrying member charged by the charging device so as to form an electrostatic latent image with attenuated electrostatic charge;

a developing device that includes:

a development container which contains a non-magnetic one-component developer composed only of a toner;

a developer carrying member which is brought into pressure contact with the image carrying member at a prescribed pressing force and carries the toner on an outer circumferential surface to form a toner layer; and a regulation blade which makes contact with the outer circumferential surface of the developer carrying member so as to regulate a thickness of the toner layer formed on the outer circumferential surface of the developer carrying member, the developing device supplying the toner to the image carrying member on which the electrostatic latent image has been formed;

a development voltage power supply that applies a development voltage to the developer carrying member; and a control section that controls driving of the developing device and the development voltage power supply, wherein the developer carrying member includes a rotary shaft and a roller portion stacked on an outer circumferential surface of the rotary shaft, a resistance value of the roller portion is 9 to 11 [Log Ω], and when an amount of the toner conveyed on the developer carrying member and regulated by the regulation blade is Md [g/m$^2$], an amount of the toner adhered on the image carrying member in a solid image by movement of the toner from the developer carrying member to the image carrying member due to the development voltage is Mp [g/m$^2$], a peripheral speed of the developer carrying member is Sd [mm/sec], and a peripheral speed of the image carrying member is Sp [mm/sec], formulae (1) and (2) below are satisfied, $$0.8 \times Sd/Sp < Mp/Md \quad (1)$$

$$0.8 \leq Sd/Sp \leq 1.2. \quad (2)$$

2. The image forming apparatus according to claim 1, wherein formulae (3) and (4) below are satisfied, $$0.9 \times Sd/Sp < Mp/Md \quad (3)$$

$$0.8 \leq Sd/Sp \leq 0.9 \text{ or } 1.1 \leq Sd/Sp \leq 1.2. \quad (4)$$

3. The image forming apparatus according to claim 1, wherein 5≤Md≤10 is satisfied.

4. The image forming apparatus according to claim 1, wherein 3≤Mp≤7 is satisfied.

5. The image forming apparatus according to claim 1, wherein the developer carrying member includes a coat layer stacked on an outer circumferential surface of the roller portion, and the coat layer does not include an electronic conductive agent and an ionic conductive agent.

6. The image forming apparatus according to claim 1, wherein a melt viscosity [Pa·s] of the toner at 95° C. is equal to or greater than 10,000 and equal to or less than 200,000.

7. The image forming apparatus according to claim 1, wherein the developing device includes a toner supply member that abuts on the outer circumferential surface of the developer carrying member to form a supply nip between the toner supply member and the developer carrying member, supplies the toner to the developer carrying member, and collects the toner from the developer carrying member, the development voltage power supply applies a supply voltage to the toner supply member, and applies a regulation voltage to the regulation blade, and the control section changes at least one of the supply voltage and the regulation voltage according to a change in a specific condition that produces a variation in the amount Mp of the toner adhered.

8. The image forming apparatus according to claim 7, wherein the specific condition is a temperature and a humidity in a vicinity of the image forming apparatus or the developing device.

9. The image forming apparatus according to claim 7, wherein the specific condition is the peripheral speed Sp of the image carrying member.

* * * * *